United States Patent Office 3,450,815
Patented June 17, 1969

3,450,815
METHOD OF STIMULATING A HOST DEFENSE MECHANISM WITH AN ACTINOVACCINE
Bernard Fishbein, Princeton, N.J., assignor to Princeton Laboratories, Inc., Princeton, N.J., a corporation of New Jersey
No Drawing. Filed Apr. 24, 1964, Ser. No. 362,498
Int. Cl. A61k 23/00
U.S. Cl. 424—88                               7 Claims

ABSTRACT OF THE DISCLOSURE

A new class of non-specific vaccines termed actinovaccines are produced from the water insoluble component of the mycelia obtained from the growth of cultures of microorganisms of the families Actinomycetaceae and Streptomycetaceae. These novel vaccines are non-specific and when administered to mammals stimulate immunity against a wide variety of heterologous pathogenic microorganisms.

---

This invention relates to a method for the preparation of new and useful non-specific vaccines, and to the resulting vaccines. More particularly, it relates to a new class of relatively non-toxic vaccines, which have been termed Actinovaccines, and which are non-specific, i.e., when administered to mammals they stimulate immunity against a wide variety of heterologous pathogenic microorganisms.

It is among the objects of the present invention to provide a novel class of non-specific vaccines prepared from the growth of cultures of microorganisms which are members of the families Actinomycetaceae and Streptomycetaceae.

An additional object of the invention is to provide a method for the preparation, recovery and purification of the aforesaid vaccines.

The nature and objects of the invention will be more fully apparent from a consideration of the following detailed description of preferred embodiments thereof.

In accordance with the invention, non-specific vaccines are prepared from the culture of a microorganism within the family Actinomycetaceae, including species of the genus Nocardia and of the genus Actinomyces; or from a microorganism within the family Streptomycetaceae, including species of the genus Streptomyces, Micromonospora and Thermoactinomyces, as defined in Bergey's Manual of Determinative Bacteriology, 7th edition. The vaccines produced from such microorganisms, in the manner described hereinafter, have been termed Actinovaccines.

The Actinovaccines are produced by cultivating cultures of the indicated microorganisms, preferably under submerged fermentation conditons, in an aqueous carbohydrate solution containing a nitrogenous nutrient. Each organism is grown under those conditions most favorable to its proliferation. Conditions of growth, such as the temperature, aeration, agitation, pH and harvest age may therefore vary considerably, depending upon the particular microorganism to be grown.

The mycelial growth thus produced is separated from the whole broth, the supernatant liquid discarded and the mycelial mat washed to removed the water-soluble components, e.g., the protein or carbohydrate and salt constituents, therefrom. The mycelia are thereafter dried and dispersed, preferably in a pyrogen-free saline solution, to facilitate administration, the individual cells being disrupted to break the hyphal elements thereof into minute fragments and provide the novel Actinovaccines hereof.

Preferably, the organism utilized to prepare the novel Actinovaccine is grown under submerged, aerobic fermentation conditions utilizing, for example, any of the commercially available nutrient media such as BBI (Baltimore Biological Labs.), Trypticase Soy Broth, Difco Bacto Brain Heart Infusion (BHI) broth, Difco Bacto Nutrient Broth or the like. The nutrient medium may suitably contain, as a source of carbon, a commercially available sugar, other carbohydrate or a glyceride oil; and as a source of nitrogen, inorganic salts such as ammonium sulphate and sodium nitrate, or organic materials, often in crude form, such as corn steep liquor, distillers' solubles, yeast extract, soy peptone, etc.; and when desired, mineral salts or buffering agents such as calcium carbonate. The ingredients of such nutrient media may include, for example, any of those water-soluble nutrients listed in Duggar Patent No. 2,482,055, granted on Sept. 13, 1949.

The mycelia are conveniently separated from the whole broth by filtration or centrifugation, using sterile pyrogen-free equipment. The supernatant liquid is then discarded and the mycelial mat thoroughly washed with sterile pyrogen-free water. As indicated hereinabove, the mat is thereafter dried. Preferably, the drying operation is effected by first killing the cells by washing with acetone or a water miscible lower alkanol having from 1 to 4 carbon atoms, e.g., ethanol, and thereafter evaporating the residual solvent in vacuo. Alternatively, a live vaccine may be produced when the mycelial mat is dried by lyophilization. The dried mats, which are stable for periods of upwards of a year without loss of activitiy, are desirably pulverized to powders for ease of handling.

The appropriate weight of the dried preparation is conveniently suspended in a pyrogen-free saline solution which may, if desired, contain phenol, e.g., about 0.25% by weight, or other desirable diluents. The aqueous suspension is thereafter agitated, either by mechanical means, e.g., in a Waring Blendor, a VirTis homogenizer or similar device; by sonic vibrations; or by treatment with suitable enzymes such as lysozyme. Agitation of the dispersion breaks the long hyphal elements of the material into relatively small fragments, providing the desired Actinovaccine. The Actinovaccine suspension may conveniently be frozen and stored for later use.

Actinovaccines prepared as described above from cultures of the genus Nocardia, Actinomyces, Streptomyces, Micromonospora and Thermoactinomyces have been found to stimulate immunity against a wide variety of heterologous infections, when injected into mice. Various of the Actinovaccines which have been tested for toxicity are free of toxic reactions at doses over 1,000 times the protective dose, as measured by death or illness of the mice treated.

The Actinovaccine are relatively stable to treatment with acid (0.25 N trichloroacetic acid–3 hrs.), and alkali (0.01 N caustic soda–24 hrs.). Moreover, the Actino-vaccines are relatively stable with respect to heat, little loss of protective activity being noted when they are maintained at 100° C. temperatures for periods of about 5 minutes.

The following examples illustrate the preparation and characteristics of several preferred Actinovaccines of the present invention; it will be appreciated that the invention is not limited to the species described in such examples.

Examples 1–32

Actinovaccines were prepared using organisms listed in Table 1 by transferring a growth from a slant of each of the various organisms to 50 ml. of sterile BBL Trypticase Soy Broth in a 250 ml. Erlenmeyer flask and incubating on a rotary shaker at 200 r.p.m. Temperatures of growth and harvest age for each culture are indicated in Table 1.

The flasks were removed from the shaker and the contents filtered through sterile filter paper. The filtrates were discarded and the mat washed repeatedly with sterile pyrogen-free water until the wash was free of carbohydrate and protein. The water wash was followed by a wash of two volumes of acetone. The mat was then removed from the filter paper and residual acetone removed by evaporating in vacuo.

The dried mycelium was pulverized and 20 mg. of the mycelium transferred to a sterile pyrogen-free Waring Blendor jar 100 ml. sterile pyrogen-free saline solution was added to the blender jar and the blender jar was chilled in a refrigerator. The contents were then blended for 15 minutes.

Sterility of the Actinovaccines thus produced was determined by streaking on plates of Difco BHI agar. The suspensions of Actinovaccines were also tested for antibiotic activity on a *B. subtilis* assay plate, since many of the organisms used were capable of elaborating antibiotics; the tests failed to indicate any antibiotic activity.

TABLE 1.—PREPARATION OF VARIOUS ACTINOVACCINES

| Example | Actinovaccine source | Temp., (° C.) | Harvest age (days) |
|---|---|---|---|
| 1 | Streptomyces albosporeus, ATCC 3003. | 25 | 2 |
| 2 | Streptomyces albus, ATCC 618. | 25 | 2 |
| 3 | Streptomyces aureofaciens, NRRL 2209. | 25 | 2 |
| 4 | Streptomyces aureus, ATCC 3309. | 25 | 2 |
| 5 | Streptomyces diastaticus, ATCC 3315. | 25 | 2 |
| 6 | Streptomyces flavovirens, ATTC 3320. | 25 | 2 |
| 7 | Streptomyces flavus, ATCC 3369. | 25 | 2 |
| 8 | Streptomyces griseus, ATCC 10137. | 25 | 2 |
| 9 | Streptomyces griseus, Rutgers 3527. | 25 | 2 |
| 10 | Streptomyces lipmanii, ATCC 3331. | 25 | 2 |
| 11 | Streptomyces odorifera, ATCC 6246. | 25 | 2 |
| 12 | Streptomyces olivaceus, NRRL B1125. | 25 | 2 |
| 13 | Streptomyces parvus, NRRL B1255. | 25 | 2 |
| 14 | Streptomyces rimosus, NRRL B2234. | 25 | 2 |
| 15 | Streptomyces roseochromogenus, ATCC 3347. | 25 | 2 |
| 16 | Streptomyces vinaceus, NRRL B1381. | 25 | 2 |
| 17 | Streptomyces viridichromogenus, ATCC 3356. | 25 | 2 |
| 18 | Streptomyces sp. PS44, NRRL 3121. | 35 | 3 |
| 19 | Micromonospora chalcea, NRRL B944. | 35 | 7 |
| 20 | Micromonospora fusca, NRRL B943. | 35 | 7 |
| 21 | Micromonospora sp., Rutgers LN 1. | 35 | 6 |
| 22 | Micromonospora sp., Rutgers W 22. | 35 | 10 |
| 23 | Micromonospora sp., NRRL B1573. | 35 | 7 |
| 24 | Nocardia caprae, Rutgers 659. | 35 | 5 |
| 25 | Nocardia caviae, NRRL B970. | 35 | 5 |
| 26 | Nocardia coeliaca, NRRL B1365. | 27 | 5 |
| 27 | Nocardia globerula, NRRL B1306. | 27 | 5 |
| 28 | Nocardia sp., Rutgers L 18. | 27 | 10 |
| 29 | Thermoactinomyces glaucus, NRRL B1981. | 35 | 7 |
| 30 | Thermoactinomyces thalpophilus, NRRL B1982. | 35 | 7 |
| 31 | Thermoactinomyces vulgaris, Rutgers P 10. | 35 | 3 |
| 32 | Thermoactinomyces vulgaris, Rutgers 37-10A. | 35 | 5 |

Table 2 below summarizes the results obtained employing the Actinovaccines of Examples 1–32, administered 24 hours prior to challenge in a single dose of 100 mcg./mouse, i.p., against an *E. coli* peritonitis. The mice treated in this and the subsequent experiments described hereinafter were 18–20 gram Swiss albino mice of the HaM/ICR strain (Charles River).

0.25 ml. of an 18 hour culture of *E. coli* in Difco BHI broth, diluted 1/5 in BHI broth (approximately $3 \times 10^8$ organisms/ml.) was used as the challenge. This challenge results in less than 10% survivors in 24 hours in control mice treated only with saline solution.

TABLE 2

| Example | Actinovaccine source | Survivor ratio [1] |
|---|---|---|
| 1 | Streptomyces albosporeus, ATTC 3003. | 5/5 |
| 2 | Streptomyces albus, ATCC 618. | 5/5 |
| 3 | Streptomyces aureofaciens, NRRL 2209. | 4/5 |
| 4 | Streptomyces aureus, ATCC 3309. | 3/5 |
| 5 | Streptomyces diastaticus, ATCC 3315. | 5/5 |
| 6 | Streptomyces flavovirens, ATCC 3320. | 4/5 |
| 7 | Streptomyces flavus, ATCC 3369. | 5/5 |
| 8 | Streptomyces griseus, ATCC 10137. | 3/5 |
| 9 | Streptomyces griseus, Rutgers 3527. | 3/5 |
| 10 | Streptomyces lipmanii, ATCC 3331. | 5/5 |
| 11 | Streptomyces odorifera, ATCC 6246. | 5/5 |
| 12 | Streptomyces olivaceus, NRRL B1125. | 5/5 |
| 13 | Streptomyces parvus, NRRL B1255. | 5/5 |
| 14 | Streptomyces rimosus, NRRL B2234. | 4/5 |
| 15 | Streptomyces roseochromogenus, ATCC 3347. | 4/5 |
| 16 | Streptomyces vinaceus, NRRL B1381. | 5/5 |
| 17 | Streptomyces viridichromogenus, ATCC 3356. | 3/5 |
| 18 | Streptomyces sp. PS44, NRRL 3121. | 5/5 |
| 19 | Micromonospora chalcea, NRRL B944. | 4/5 |
| 20 | Micromonospora fusca, NRRL B943. | 5/5 |
| 21 | Micromonospora sp., Rutgers LN 1. | 3/5 |
| 22 | Micromonospora sp., Rutgers W 22. | 4/5 |
| 23 | Micromonospora sp., NRRL B1573. | 5/5 |
| 24 | Nocardia caprae, Rutgers 659. | 4/5 |
| 25 | Nocardia caviae, NRRL B970. | 4/5 |
| 26 | Nocardia coeliaca, NRRL B1365. | 3/5 |
| 27 | Nocardia globerula, NRRL B1306. | 3/5 |
| 28 | Nocardia sp., Rutgers L 18. | 4/5 |
| 29 | Thermoactinomyces glaucus, NRRL B1981. | 4/5 |
| 30 | Thermoactinomyces thalpophilus, NRRL B1982. | 4/5 |
| 31 | Thermoactinomyces vulgaris, Rutgers P 10. | 4/5 |
| 32 | Thermoactinomyces vulgaris, Rutgers 37-10A. | 3/5 |

[1] Numbers of survivors/number of mice subjected to *E. coli* challenge, 4 days after challenge.

It has been found that individual Actinovaccines vary in activity. Hence, the Actinovaccine from *T. vulgaris* P-10 at a dose of 1 mcg./mouse protected 4/5 mice against an *E. coli* peritonitis, whereas the Actinovaccine from *S. viridichromogenus* failed to protect at 10 mcg./mouse.

Table 3 below summarizes the results obtained using the Actinovaccines of Examples 1–32, administered in single doses of 100 mcg./mouse, i.p., in protecting against a challenge of *S. aureus* (Smith), i.p., administered 24 hours after treatment.

An 18 hour culture of an *S. aureus* (Smith) strain in BHI broth was centrifuged, washed with saline solution, and reconstituted in saline, and used as challenge at 0.25 ml., i.p. (approximately $7.5 \times 10^8$ organisms/ml.). This challenge results in less than 10% survivors in the saline controls in 24 hours.

TABLE 3.—INFLUENCE OF VARIOUS ACTINOVACCINES ON SURVIVAL OF MICE TO CHALLENGE WITH *S. AUREU* (SMITH), i.p.

| Example | Actinovaccine source | Survivor ratio [1] |
|---|---|---|
| 1 | Streptomyces albosporeus, ATCC 3003. | 4/5 |
| 2 | Streptomyces albus, ATCC 618. | 5/5 |
| 3 | Streptomyces aureofaciens, NRRL 2209. | 5/5 |
| 4 | Streptomyces aureus, ATCC 3309. | 5/5 |
| 5 | Streptomyces diastaticus, ATCC 3315. | 5/5 |
| 6 | Streptomyces flavovirens, ATCC 3320. | 4/5 |
| 7 | Streptomyces flavus, ATCC 3369. | 5/5 |
| 8 | Streptomyces griseus, ATCC 10137. | 5/5 |
| 9 | Streptomyces griseus, Rutgers 3527. | 4/5 |
| 10 | Streptomyces lipmanii, ATCC 3331. | 5/5 |
| 11 | Streptomyces odorifera, ATCC 6246. | 5/5 |
| 12 | Streptomyces olivaceus, NRRL B1125. | 5/5 |
| 13 | Streptomyces parvus, NRRL B1255. | 4/5 |
| 14 | Streptomyces rimosus, NRRL B2234. | 4/5 |
| 15 | Streptomyces roseochromogenus, ATCC 3347. | 4/5 |
| 16 | Streptomyces vinaceus, NRRL B1381. | 4/5 |
| 17 | Streptomyces viridichromogenus, ATCC 3356. | 5/5 |
| 18 | Streptomyces sp. PS 44, NRRL 3121. | 5/5 |
| 19 | Micromonospora chalcea, NRRL B944. | 5/5 |
| 20 | Micromonospora fusca, NRRL B943. | 5/5 |
| 21 | Micromonospora sp., Rutgers LN 1. | 5/5 |
| 22 | Micromonospora sp., Rutgers W 22. | 5/5 |
| 23 | Micromonospora sp., NRRL B1573. | 5/5 |
| 24 | Nocardia caprae, Rutgers 659. | 5/5 |
| 25 | Nocardia cavia, NRRL B970. | 5/5 |
| 26 | Nocardia coeliaca, NRRL B1365. | --- |
| 27 | Nocardia globerula, NRRL B1306. | 5/5 |
| 28 | Nocardia sp., Rutgers L 18. | 5/5 |
| 29 | Thermoactinomyces glaucus, NRRL B1981. | 5/5 |
| 30 | Thermoactinomyces thalpophilus, NRRL B1982. | 5/5 |
| 31 | Thermoactinomyces vulgaris, Rutgers P-10. | 5/5 |
| 32 | Thermoactinomyces vulgaris, Rutgers 37-10A. | 5/5 |

[1] Number of survivors/number of mice subjected to *S. aureus* challenge, 4 days after challenge.

Table 4 below summarizes results with various of the Actinovaccines of the preceding examples administered in single doses of 100 mcg./mouse, i.p., 24 hours prior to challenge in protecting against a challenge of Pseudomonas aeruginosa.

An 18 hour culture in BHI broth diluted 1/10 in BHI (approximately $1.2 \times 10^8$ organisms/ml.) in a dose of 0.25 ml., i.p., was administered, as the challenge. This challenge in 24 hours results in less than 5% survivors in the controls treated only with saline solution. Table 3 indicates the survivor ratios after 24 hours and 96 hours, showing the increase of survivors to the acute effects and the prolongation of survivor time effected by use of the Actinovaccines.

TABLE 4.—INFLUENCE OF VARIOUS ACTINOVACCINES ON SURVIVAL OF MICE TO CHALLENGE WITH PSEUDOMONAS AERUGINOSA, i.p.

| Example | Actinovaccine source | Survivor ratio [1] | Survivor ratio [2] |
|---|---|---|---|
| 1 | Streptomyces albosporeus, ATCC 3033. | 3/5 | 2/5 |
| 2 | Streptomyces albus, ATCC 618 | 5/5 | 5/5 |
| 3 | Streptomyces aureofaciens, NRRL 2209. | 4/5 | 2/5 |
| 5 | Streptomyces diastaticus, ATCC 3315. | 5/5 | 3/5 |
| 8 | Streptomyces griseus, ATCC 10137 | 3/5 | 3/5 |
| 11 | Streptomyces odorifera, ATCC 6246 | 4/5 | 4/5 |
| 14 | Streptomyces rimosus, NRRL B2234 | 5/5 | 1/5 |
| 15 | Streptomyces roseochromogenus, ATCC 3347. | 2/5 | 2/5 |
| 16 | Streptomyces vinaceus, NRRL B 1381. | 4/5 | 2/5 |
| 20 | Micromonospora fusca, NRRL B943 | 5/5 | 4/5 |
| 21 | Micromonospora sp., Rutgers LN 1 | 5/5 | 5/5 |
| 22 | Micromonospora sp., Rutgers W 22 | 4/5 | 3/5 |
| 24 | Nocardia caprae, Rutgers 659 | 3/5 | 3/5 |
| 25 | Nocardia caviae, NRRL B970 | 5/5 | 3/5 |
| 26 | Nocardia coeliaca, NRRL B1365 | 3/5 | 4/5 |
| 31 | Thermoactinomyces vulgaris, Rutgers P10. | 5/5 | 4/5 |
| 32 | Thermoactinomyces vulgaris, Rutgers 37-10A. | ---- | ---- |

[1] Number of survivors/number of mice subject to P. aeruginosa, 1 day after challenge.
[2] Number of survivors/number of mice subjected to P. aeruginosa, 4 days after challenge.

Table 5 below summarizes results obtained using various of the Actinovaccines of the preceding examples, administered in single doses of 100 mc./mouse, 24 hours prior to challenge with Salmonella typhimurium.

An 18 hour culture in BHI broth diluted 1/1000 in BHI (approximately $1.3 \times 10^5$ organisms/ml.) in a 0.25 ml. dose, i.p., was used. On days 3, 4 and 5, survivors in the saline controls were 60%, 40%, and 0%, respectively. Survival of treated groups is given on days 4, 5 and 7 to show the increase in survival time over controls.

TABLE 5.—INFLUENCE OF VARIOUS ACTINOVACCINES ON SURVIVAL OF MICE TO CHALLENGE WITH SALMONELLA TYPHIMURIUM

| | | Survivor ratio [1] | | |
|---|---|---|---|---|
| Example | Actinovaccine source | 4 days | 5 days | 7 days |
| 2 | Streptomyces albus, ATCC 618 | 5/5 | 2/5 | 1/5 |
| 3 | Streptomyces aureofaciens, NRRL 2209. | 5/5 | 5/5 | 4/5 |
| 11 | Streptomyces odorifera, ATCC 6246 | 5/5 | 4/5 | 4/5 |
| 14 | Streptomyces rimosus, NRRL B2234 | 5/5 | 4/5 | 4/5 |
| 16 | Streptomyces vinaceus, NRRL B1381 | 4/5 | 2/5 | 2/5 |
| 18 | Streptomyces sp., PS 44, NRRL 3121. | 3/5 | 2/5 | 2/5 |
| 21 | Micromonospora sp., Rutgers LN 1 | 5/5 | 4/5 | 4/5 |
| 31 | Thermoactinomyces vulgaris, Rutgers P10. | 5/5 | 4/5 | 3/5 |

[1] Number of survivors/number of mice subject to Salmonella typhimurium.

Example 33.—Actinovaccine from Streptomyces sp. PS 44–NRRL 3121

250 ml. Erlenmeyer flasks containing 50 ml. BBL Trypticase Soy Broth were inoculated with the growth from a slant of Streptomyces sp. PS 44 NRRL 3121. The flasks were incubated in a rotary shaker at 200 r.p.m. at a temperature of 35° C. for 24 hours. 459 ml. of this inoculum was used to inoculate a 14 liter glass-lined fermentor containing 9 liters of BBL Trypticase soy broth. The fermentor was stirred by dual impellers at 100 r.p.m. at a temperature of 35° C. and an air rate of 0.1 air vol./vol. liquid for a period of 72 hours. The batch was centrifuged in a continuous centrifuge and the cell-free filtrate discarded.

The cells were washed with sterile pyrogen-free water until the wash was free of carbohydrate and protein. The water wash was followed by an acetone wash and residual acetone evaporated in vacuo. The dried mat was pulverized for ease of handling.

200 mg. of cell material prepared as described was suspended in 100 ml. sterile pyrogen-free water in a 250 ml. VirTis baffled flask. 125 g. glass beads (0.2 mm. size) was added to the flask and the material was homogenized for 15 minutes at 45,000 r.p.m. in the cold. The supernatant suspension was separated from the glass beads and the glass beads washed with water. The wash containing additional cell material was pooled with the original suspension, frozen and lyophlized.

200 mg. of the lyophilized Actinovaccine was dispersed in 50 ml. sterile pyrogen-free saline solution.

In order to determine the efficacy of a heterologous route of administration to the route of challenge, the Actinovaccine prepared as described above was administered by intramuscular route while challenge in all cases was by intraperitoneal route. The Actinovaccine was given at 0.25 ml. i.m. (1 mg.) 24 hours prior to challenge with E. coli, S. aureus (Smith), and Pseudomonas aeruginosa, prepared as described above; and K. pneumoniae, an 18 hour culture in BHI diluted 1/10,000 in BHI (approximately $1.5 \times 10^5$ organisms/ml.), 0.25 ml. i.p. The last mentioned challenge results in 13% survivors in 3 days in control mice given only saline solution.

The influence of this Actinovaccine administered by i.m. route on survival of mice to the various i.p. challenges is summarized in Table 7.

Table 7

| Challenge organism i.p. | Actinovaccine survivor ratio [1] |
|---|---|
| E. coli | 4/5 |
| S. aureus (Smith) | 4/5 |
| Pseudomonas aeruginosa | 5/5 |
| Klebsiella pneumoniae | 7/10 |

[1] Number of survivors/number of mice challenged; survivor ratio determined 3 days after challenge with K. pneumoniae and 4 days after challenge with each of the other organisms.

Example 34.—Ultrasonic rupture of mycelia of Actinovaccines 20 mg. of the acetone dried Actinovaccine of Streptomyces sp. PS 44 NRRL 3121 prepared as described in Example 33, were suspended in 100 ml. saline solution and placed in an ultrasonic oscillator with an output of 90 kc., 40 watts, for 30 minutes. Such treatment disrupted the mycelia into smaller fragments. The Actinovaccine suspension was administered to mice, 0.5 ml. i.p., and 24 hours later the mice were challenged with E. coli, i.p. 5/5 mice survived the challenge.

Example 35.—Enzymatic rupture of mycelia of Actinovaccines 20 mg. of the acetone dried Actinovaccine of Streptomyces sp. PS 44 NRRL 3121 prepared as described in Example 33, were suspended in 100 ml. saline phosphate buffer, pH 7.0 1 mg. lysozyme was added and the suspension incubated at 35° C. for 1 hour. The partially lysed cells were centrifuged and washed with sterile pyrogen-free water, re-suspended in water and lyophilized.

The lyophilized cells were suspended in water at 200 mcg./ml. and administered to mice, 0.5 ml., i.p. The mice were challenged with E. coli, i.p., 24 hours after treatment. 7/8 mice survived the challenge.

Example 36.—Live Actinovaccine

A live Actinovaccine was prepared from Streptomyces sp. PS 44 NRRL 3121 as follows. Growth from a slant of Streptomyces sp. PS 44 NRRL 3121 was transferred to 250 ml. Erlenmeyer flasks containing 50 ml. of BBL Trypticase Soy Broth. The flasks were incubated at 25° C. on a rotary shaker at 200 r.p.m. for a period of 48 hours. The whole broth was filtered through sterile filter paper and washed repeatedly with sterile pyrogen-free water until the washings were free of protein and carbohydrate.

The washed mycelium was placed in a sterile vessel and lyophilized. The dried preparation was pulverized and 20 ml. of this material placed in a sterile Waring Blendor jar with 100 ml. of sterile pyrogen-free saline and chilled. The suspension was blended for 15 minutes. This Actinovaccine was streaked on Difco Nutrient Agar and examination of plates indicated the Actinovaccine to be viable.

The live Actinovaccine was administered to mice at 100 mcg./mouse and 10 mcg./mouse 24 hours prior to challenge with *E. coli* i.p. 5/5 mice survived the challenge at both 10 mcg./mouse and 100 mcg./mouse.

Example 37.—Actinovaccine from *Actinomyces Bovis*–ATCC 12836

An Actinovaccine was prepared from *Actinomyces bovis* ATCC 12836 by transferring growth from a slant of the organism to a 50 ml. portion of Difco BHI broth in 250 ml. Erlenmeyer flasks and incubating on a rotary shaker at 200 r.p.m. The flasks were filled with nitrogen to maintain anaerobiosis and maintained at a temperature of 35° C.; after a period of 10 days growth the cultures were harvested. The flasks were then removed from the shaker and the contents filtered through sterile filter paper. The filtrates were discarded and the mycelial mat washed repeatedly with sterile pyrogen-free water until the wash was free of carbohydrate and protein. The mat was thereafter washed with acetone, and the residual acetone removed by evaporation in vacuo.

The dried mycelia were pulverized and suspended in saline solution as indicated above in connection with Examples 1–32.

The effect of the Actinovaccine thus prepared was determined with respect to *E. coli*, *S. aureus* (Smith), and *P. aeruginosa* challenges prepared and administered as described in the preceding examples. The Actinovaccine was administered 24 hours prior to challenge, in single doses of 100 mcg./mouse.

The results are tabulated in Table 8 below:

Table 8

| Challenge: | Survivor ratio [1] |
|---|---|
| *E. coli*, i.p. | 5/5 |
| *S. aureus* (Smith), i.p. | 5/5 |
| *P. aeruginosa*, i.p. | 4/5 |

[1] Number of survivors/number of mice subjected to challenge, 4 days after challenge; in the case of challenge with *P. aeruginosa*, the survivor ratio was determined both one day and 4 days after the challenge and the ratio was found to be the same.

The present invention thus provides for the preparation of new and useful non-specific Actinovaccines which stimulate the host defense mechanisms and thereby may be useful in potentiating relatively ineffective antibacterial agents in order to provide greater activity, or which may facilitate the use of lower effective doses of toxic antibacterial agents.

I claim:
1. A method of stimulating the host defense mechanism of a mammal against organisms selected from the group consisting of *E. coli*, *S. aureus* (Smith), *Pseudomonas aeruginosa*. *Salmonella typhimurium*, and *Klebsiella pneumoniae*, which comprises administering to the host an actinovaccine composition comprising the washed, water insoluble components of myceleia derived from the culture of a microorganism within a family selected from the group consisting of Actinomycetaceae and Streptomycetaceae cultivated in an aqueous medium containing a nitrogenous nutrient.

2. A method of claim 1 wherein the component of the myceleia utilized is in the cell wall disrupted form.

3. A method of cliam 1 wherein the microorganism from which the actinovaccine is derived is within the genus Actinomyces.

4. A method of claim 1 wherein the microorganism from which the actinovaccine is derived is within the genus Nocardia.

5. A method of claim 1 wherein the microorganism from which the actinovaccine is derived is within the genus Micromonospora.

6. A method of claim 1 wherein the microorganism from which the actinovaccine is derived is within the genus Streptomyces.

7. A method of claim 1 wherein the microorganism from which the actinovaccine is derived is within the genus Thermoactinomyces.

References Cited

FOREIGN PATENTS 527,803   10/1940   Great Britain.

OTHER REFERENCES

Goyal: A Serological Study of the Actinomyces Ind. Jour. Med. Res., 25, 4 April 1938, pp. 843–846, 167–78 Fungi.

ALBERT T. MEYERS, *Primary Examiner.*

D. M. STEPHENS, *Assistant Examiner.*

U.S. Cl. X.R.

424—92